Jan. 30, 1968  F. K. FLOYD  3,365,982
MECHANICAL DRIVE MECHANISM
Filed Feb. 28, 1966  6 Sheets-Sheet 1
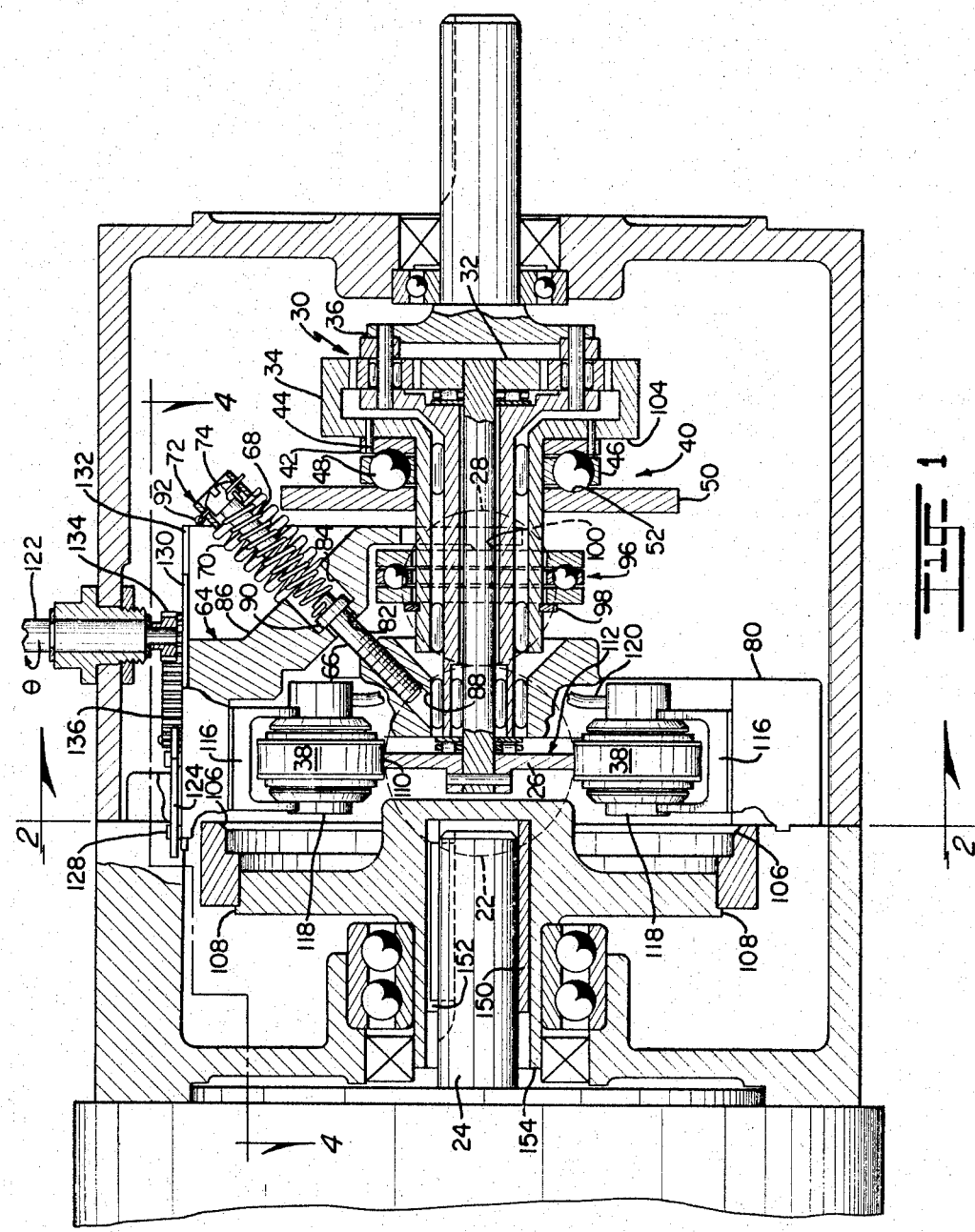
INVENTOR.
FREDERICK K. FLOYD
BY *Sheridan and Ross*
ATTORNEYS

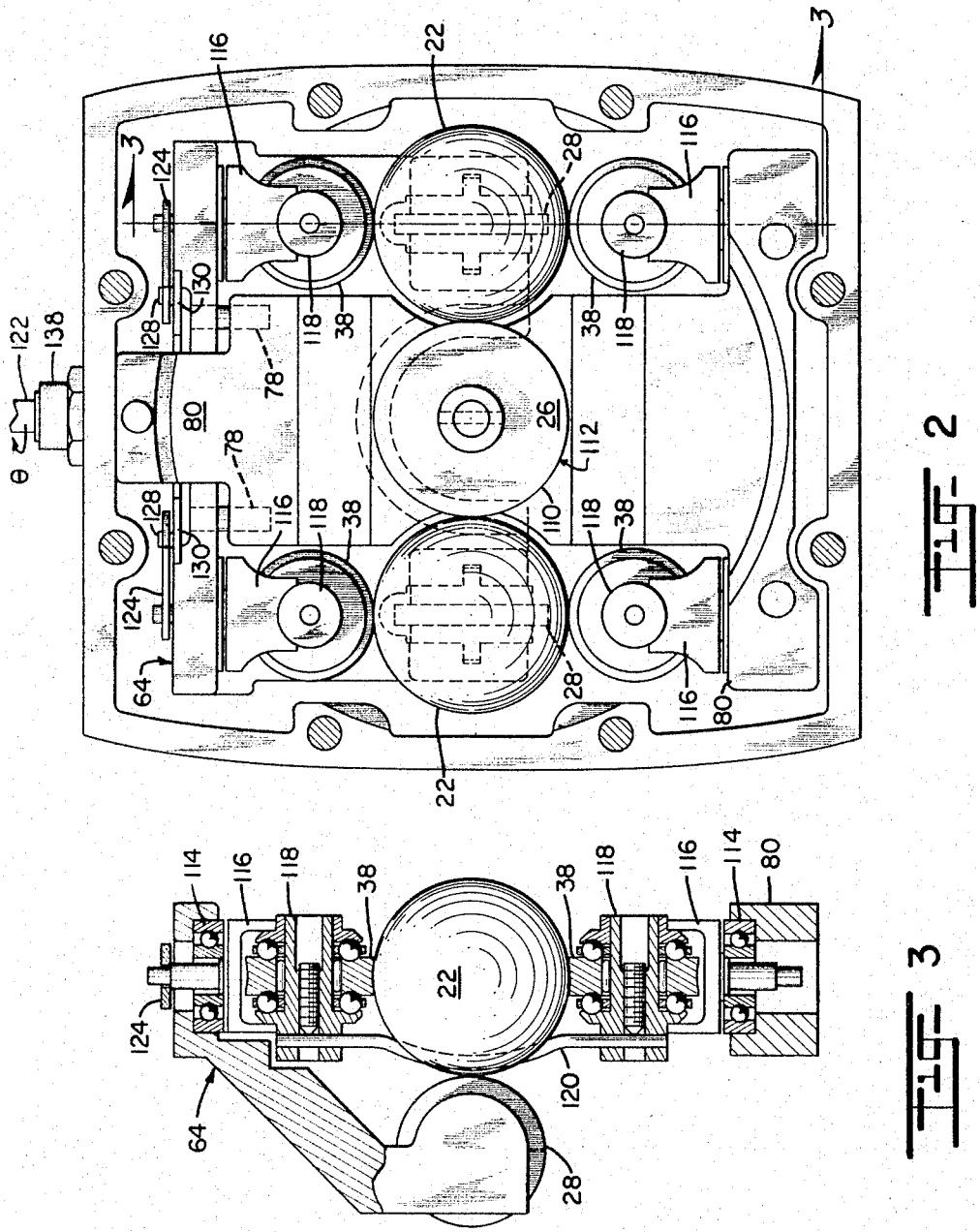

Jan. 30, 1968    F. K. FLOYD    3,365,982
MECHANICAL DRIVE MECHANISM
Filed Feb. 28, 1966    6 Sheets-Sheet 4

INVENTOR.
FREDERICK K. FLOYD
BY Sheridan and Ross
ATTORNEYS

INVENTOR.
FREDERICK K. FLOYD
BY Sheridan and Ross
ATTORNEYS

INVENTOR.
FREDERICK K. FLOYD
BY Sheridan and Ross

ATTORNEYS

3,365,982
MECHANICAL DRIVE MECHANISM
Frederick K. Floyd, Denver, Colo., assignor to Floyd Drives Company, Denver, Colo., a corporation of Colorado
Filed Feb. 28, 1966, Ser. No. 530,493
26 Claims. (Cl. 74—690)

ABSTRACT OF THE DISCLOSURE

A plural power path transmission including an infinitely variable friction drive having two outputs which are drivingly related to two elements of a planetary gear set. A torque sensor is provided in one of the paths to maintain non-slipping frictional contact of the friction drive.

---

The present invention relates to a self-contained mechanical powered transmission apparatus and particularly to a drive mechanism that functions primarily as an infinitely variable speed drive and as a positioning device with inherent functions of a clutch, a brake and a torque limitor. Among its uses are (1) industrial applications such as process control, materials handling, work positioning, machine tool and welding feeds; (2) data handling applications such as microfilm drive, a magnetic and punch scanning and index scanning; (3) military applications such as radar antenna, servomechanisms, sequence programming, fuel pumps, gun and camera mounts and trajectory tracking; and (4) instrument and computer applications such as in chart drives, test programming, analog computers and mechanical integration.

Mechanical variable drives as a class are widely used because they are reasonably priced, simple to operate and reliable. They are the logical, straight forward mechanical approach to mechanical control problems. However, use thereof has been limited in many applications when such factors as overloading, wide speed range, reversability, position control, response time, constancy of damping, low control energy, and control linearity are important considerations.

The drive mechanism disclosed herein constitutes an improvement of the mechanical drive mechanism shown and described in U.S. Patent No. 3,071,018. More specifically, the drive mechanism of the subject invention differs from the drive mechanism of U.S. Patent No. 3,071,018 in several respects including the use of a differential system such as a planetary gear system, an improved torque sensing thrustor means, an improved means for controlling the axes of rotation of the balls, an improved means for applying and maintaining a fixed traction contact force at normal output torques and, during overload conditions, a variable contact force proportional to the amount of overload to maintain non-slipping frictional contact between various parts used in the drive mechanism, and a uniquely formed key slot. Although the drive mechanism of U.S. Patent No. 3,071,018 performed well in many applications and represented a substantial advancement in the art, it was found that certain limitations existed in certain applications. In the herein invention it has been discovered that the ratio of output to input speed of the mechanism is continuously variable between limits in excess of plus one to minus one including zero thereby permitting zero output speed simultaneously with full input speed, and without the axis of rotation of the balls intersecting any ball traction contact, which event tends to cause traction contact damage. Additionally, the output speed of this drive mechanism is inherently proportional to the control shaft angle. No other drive mechanism utilizing differential system is known to exist which obtains this advantage.

Further, the torque sensing, thrust producing overload mechanism not only prevents traction contact slippage upon output torque overloads but also acts to limit the maximum torque that the drive mechanism will deliver thereby protecting the drive mechanism from destructive forces that would otherwise be generated and without the need of a slip clutch. This means that for all practical purposes no damage will occur within the system structure even though high overload torques or complete stall conditions are encountered and without generating excessive heat. The traction contact forces being held constant during normal output torque loads has great merit since it means the slope of the speed torque curve is negative, finite and an essentially constant value, this fact being of particular merit when the drive is used in closed loop feed-back systems wherein the inverse slope of this curve directly becomes the system damping constant and a factor in the system gain. Further, the subject drive uses improved means of controlling the axis of rotation of the balls including: simplified means of coupling top and bottom control rollers for each ball to each other so that they rotate about their gimballed axes in unison; improved profiles of the control rollers at their junction with the balls such that any output torque created reaction developed by the balls urging tilt of the gimbal axis, does in fact tilt the axis a small amount but in so doing shifts the ball-roller contact point in the opposite direction of gimbal tilt such as to create a resulting force which cancels out the initial gimbal tilting force, and the resulting force on the gimbal thus does not experience a transverse force, thereby stabilizing the gimbal axis, at the same time providing self-centering action of the control rollers on the ball in the absence of precise structural alignment; and means to permit relatively free orbital or planar motion of the gimbal axis with respect to the inner race of the gimbal supporting bearing at their junction such that any vibration produced movement of the gimbal axis will be absorbed harmlessly at said junction rather than producing false brinelling motion at the races or balls of the gimbal supporting bearing. Also, the subject drive mechanism incorporates a uniquely formed key slot which further reduces the cost of producing the mechanism.

One of the principal objects of the subject invention is to provide an improved mechanical drive mechanism.

Another object of this invention is to provide a uniquely formed key slot.

Another object of the subject invention is to provide a mechanical drive mechanism utilizing a pair of spaced apart, center fixed balls, said balls being in rolling traction contact with an input ring that drives the balls, in combination with a differential system such as a planetary gear system.

Another object of this invention is to provide a drive mechanism utilizing a pair of spaced apart, center fixed balls without axles, said mechanism incorporating a uniquely formed key slot.

Another object of this invention is to provide a drive mechanism utilizing a pair of spaced apart, center fixed balls without axles, said mechanism incorporating a member and a longitudinally extending flexible member mounted on the inner surface of said sleeve member, said flexible member, in its mounted condition, having longitudinally extending spaced apart, parallel edge portions which cooperate to form a longitudinally extending key slot.

Another object of this invention is to provide a uniquely formed key slot comprising a sleeve member and a longitudinally extending flexible member mounted on the inner surface of said sleeve member, said flexible member, in its mounted condition, having longitudinally extending spaced apart, parallel edge portions which corporate to form a longitudinally extending key slot.

Another object of this invention is to provide a drive mechanism utilizing a pair of spaced apart balls without axles but having fixed centers, said mechanism including a differential system wherein the output speed is inherently proportional to the external control shaft angle and continuous through and symmetrical about the control shaft's zero position which corresponds to zero output speed.

Another object of this invention is to provide a drive mechanism utilizing a pair of spaced apart, center fixed balls without axles in which the frictionally contacting parts are held together with sufficient force to prevent slippage during normal and overload operating conditions.

Another object of this invention is to provide a drive mechanism utilizing a pair of spaced apart, center fixed balls without axles, said mechanism including control rollers incorporating means for preventing the axes of rotation of said balls from being coincident with any surface portion of said balls disposed in frictional contact with the means driving the balls and the means driven by the balls.

Another object of this invention is to provide a drive mechanism utilizing two spaced apart, center fixed balls without axles, said mechanism having a differential system and driven means and including a system for preventing excessive overloads from being transmitted between said differential system and said driven means.

Another object of this invention is to provide a drive mechanism utilizing a pair of spaced apart, center fixed balls, said mechanism having a differential system and driven means and including a system for preventing excessive overloads from being transmitted between said differential, said system including a pair of opposed, annularly disposed recess portions each recess portion comprising a plurality of path portions each recess portion including a plurality of apex portions formed by the intersection of adjacent path portions and a plurality of bottom portions disposed intermediate adjacent path portions, the lower part of each path portion having a larger angle of inclination than the upper parts thereof, and a plurality of rollers mounted within said recess portions.

Another object of this invention is to provide a drive mechanism utilizing a pair of spaced apart, center fixed balls, said mechanism having an anti-friction face type cam which includes a plurality of rising and falling annuarly disposed surfaces the lower portions of which are relatively steep compared with the upper portions thereof, and a plurality of balls mounted for movement along said surfaces.

Another object of this invention is to provide a drive mechanism utilizing a pair of spaced apart, center fixed balls, said mechanism having an anti-friction face type cam which includes a plurality of rising and falling annularly disposed surfaces wherein adjacent surface portions terminates in an upper apex portion and a plurality of rollers are mounted for movement relative to said surfaces during overload torque conditions.

Another object of this invention is to provide a drive mechanism utilizing a pair of center fixed balls disposed about a central axis, said mechanism having a differential system and driven means and including a torque sensing thrustor means disposed intermediate said differential system and said driven means.

Another object of this invention is to provide a drive mechanism utilizing a pair of center fixed, axleless balls disposed about a central axis, said mechanism including means for applying a predetermined amount of force between the balls thereof and the parts disposed in frictional contact therewith thereby to maintain sufficient force to prevent slippage during normal and overload torque operating conditions.

Another object of this invention is to provide a drive mechanism having a pair of spaced apart, center fixed balls and means for controlling the axes of rotation of said balls, said means including a pair of rollers for each of said balls, said means including means for maintaining the axes of each of said rollers at each ball parallel with each other.

Another object of this invention is to provide a drive mechanism having a pair of spaced apart, ecnter fixed balls and means for controlling the axes of rotation of said balls, said means including a pair of rollers for each of said balls disposed in contacting engagement on opposite sides of said ball, each of said rollers being gimbally mounted, said gimbal being disposed in contacting relation with respect to a radial bearing, said gimbal and said radial bearing being mounted relative to each other to permit orbital motion of said gimbal with respect to the axis of the inner race of said bearing.

Another object of this invention is to provide a drive mechanism comprising a pair of spaced apart spherical balls having fixed centers; a driving means disposed in frictional contact with each of said balls for driving same; a pair of driven means; a rotational differential system having two input members and an output member, the output of said output member being the difference between the inputs of said input members; each of said balls frictionally contacting and driving each of said driven means, one of said driven means being coupled with one of said input members of said differential system and the other said driven means being coupled with the other input member of said differential system; and means including control rollers for contacting each ball for controlling the axes of rotation of said balls.

The foregoing and other objects and advantages of the subject invention will become apparent from the specifications and drawings in which:

FIGURE 1 is a side elevational view, in cross-section, of a drive mechanism constructed in accordance with the subject invention;

FIGURE 2 is an elevational view taken along line 2—2 of FIGURE 1;

FIGURE 3 is an elevational view, in partial cross-section, taken along line 3—3 of FIGURE 2;

In brief, the improved drive mechanism includes an input shaft coupled to a generally internal annular surface frictionally bearing on at least a pair of spherical balls disposed about a central axis, the balls being in frictional contact with and supported from moving radially inwardly by means of a generally external annular surface which is coupled to the sun gear of a planetary gear combination. The balls are also in friction contact with and urged toward the internal annular surface by a pair of direction reversing idler rollers which are also in friction contact with a common annular surface that is coupled to the ring gear of a planetary gear combination, the planet gears of the gear combination being journaled on a member which rotates with an output shaft. Means are provided to support the balls from moving circumferentially around the central axis. Means are also provided to apply a fixed normal force and a variable normal force which depends on overload output torque to the said friction contacts with the balls. Means are included to vary the axis of rotation of the balls whereby rotation of the input shaft is transmitted to the output shaft in varying ratios and torque at the output shaft is transmitted to the input shaft by the same varying ratios, said ratios including zero and negative ratios such that at any said ratio, the axes of rotation of the balls do not lie within the area of any friction contact on the balls.

Figure 13:
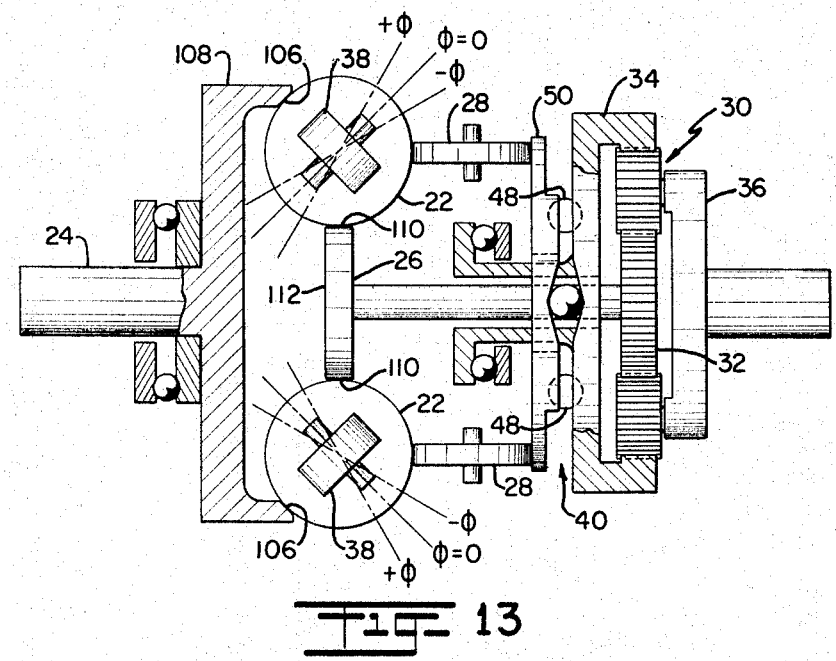
FIGURE 13 is a schematic depiction showing the drive mechanism of the subject invention.

Referring now to the drawings and particularly FIGURES 1 and 13, the mechanical drive mechanism of the subject invention includes a pair of spaced apart spherical balls 22 disposed about a central axis and having fixed centers, a driving means 24 disposed in frictional contact with each of said balls 22 for driving same, a pair of driven means 26 and 28, a rotational differential system 30 having two input members 32 and 34 and an output member 36, the output of said output member 36 being the difference between the inputs of said input members 32 and 34. Each of said balls 22 frictionally contact and drive each of said driven means 26 and 28. One of said driven means 28 is coupled with one of the input members 34 of said differential system 30 while the other of said driven mean 26 is coupled with the other of said input members 32 of said differential system 30. The drive mechanism incorporates means including control rollers 38 for controlling the axes of rotation of said balls 22.

Figure 7:
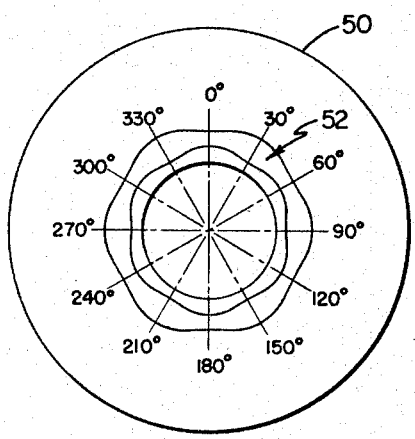
FIGURE 7 is a side elevational view of one of the elements of the torque sensing thrustor means of FIGURE 1.
Figure 8:
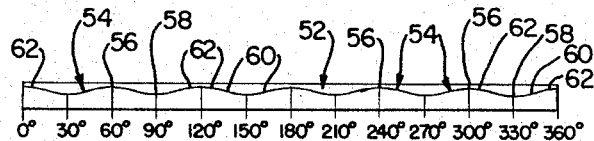
FIGURE 8 is a linear depiction of the cam surface shown in FIGURE 7.

The drive mechanism also includes a system for preventing excessive overloads from being transmitted between the differential system 30 and the driven means 26 and 28. This system, which is sometimes referred to as a torque sensing thrustor means or a torque sensing, thrust producing cam, preferably includes an anti-friction face-type cam 40. The anti-friction face-type cam 40 comprises an annular member 42 securely attached by suitable means such as spring pin 44 to one of the input means 34 of the differential system 30. However, it will be appreciated that the left side of the input member 34, as viewed in FIGURES 1 and 13, may suffice for a portion of the anti-friction face-type cam in lieu of a separate member 42. The anti-friction face-type cam 40 also includes an annular member 46 having a plurality of apertures formed therethrough and circumferentially spaced thereabout. Rollers or balls 48 are disposed within the apertures formed in member 46. The anti-friction face-type cam 40 also includes an annular member 50. The apertured member 46 is disposed intermediate the opposed surfaces of annular member 44 and annular member 50. It will be understood, however, that the rollers or balls 48 may be mounted between the opposed surfaces of the input member 34 and the annular member 50 without the necessity of annular member 46, as is shown in FIGURE 13. A fluted cam surface 52 is formed on each of the opposed surfaces of annular members 42 and 50. Referring now to FIGURES 7 and 8, the fluted cam surface 52 or recess portion is shown comprising a plurality of path portions 54. The fluted cam surface 52 or recess portion includes a plurality of apex portions 56 formed by the intersection of adjacent path portions 54 and a plurality of bottom portions 58 disposed intermediate adjacent path portions. The lower part 60 of each path portion has a larger angle of inclination than the upper part 62 thereof. The angle of inclination or slope of the lower part 60 of the path portions 54 is less than the critical value below which there is more than sufficient system force produced to prevent slippage of any output torque. The value of this particular angle depends on a number of factors such as the type of lubricating oil used, the surface finish of the path portion and the distance the path portions are located radially from the axis about which same rotate. However, it has been found that an angle of approximately 10° suffices for many applications.

Figure 5:
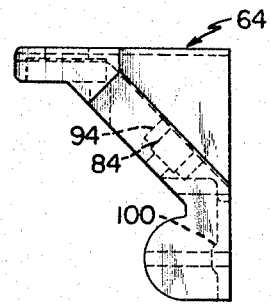
FIGURE 5 is an elevational view illustrating one of the elements of FIGURE 1.
Figure 6:
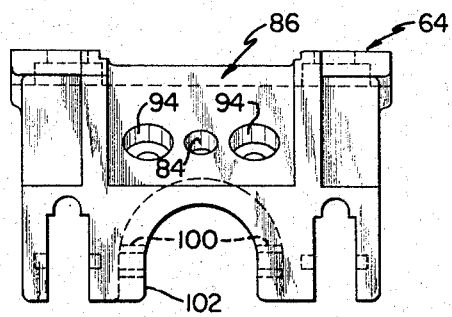
FIGURE 6 is an elevational view taken along line 6—6 of FIGURE 5.

The drive mechanism also includes a means for applying during normal operation of the mechanism a predetermined amount of force, and during overloads conditions, a variable amount of force which is proportional to the amount of overload encountered. The application of this predetermined amount of force or variable amount of force, depending upon operating conditions, is required to maintain substantially non slipping contact at all traction points within the mechanism. More specifically, the application of such a force is required to maintain frictional contact between the balls 22 and between members 28 and 50 and the driving and driven means 24, 26 and 28, and the control rollers 38 frictionally contacting said balls 22 and between the various parts of the torque sensing thrustor means or anti-friction face-type cam 40. The means required to apply the force as aforementioned includes a bracket 64, see also FIGURES 5 and 6, a pivot screw 66, a torsional take-up spring 68, load springs 70, spring plate 72, take-up member or screw 74, screws or bolts 76, and spring pins 78 (see FIGURE 2). The bracket 64 is attached to a portion 80 of the housing of the drive mechanism by means of the spring pins 78 which loosely fit into the aligned openings formed in the upper portion of tthe bracket 64 and in portion 80 of the housing. Thus, bracket 64 is constrained from transverse and longitudinal movement at and by the loose fitting spring pins 78. However, this bracket constraint permits vertical translation of the bracket 64 needed for free application of vertical forces to the control rollers 38, small rotation of the bracket 64 about a horizontal axis midway between the two spring pins 78 which is desirable to equalize the control roller forces acting on the two balls 22, and small rotation of the bracket 64 about a horizontal axis joining the two spring pins 78 for a purpose which will be later described.

The bracket 64 is also constrained by pivot screw 66. Pivot screw 66 passes through the reduced diameter portion 82 of opening 84 which is formed in a diagonally disposed portion 86 of the bracket 64. The lower end of pivot screw 66 is threadedly mounted within an opening 88 formed in portion 80 of the housing. The upper end of pivot screw 66 has a boss portion 90 formed thereabout and an opening passing transversely through said screw, said opening being disposed intermediate the upper end of the pivot screw 66 and said boss portion 90. It will be noted that clearance exists between the outer surface of the pivot screw 66 and the inner surface of reduced diameter portion 82 of opening 84. The torsional take-up spring 68 has one end thereof anchored within the opening formed intermediate the upper end of the screw 66 and boss portion 90 and the other end thereof anchored within an opening formed in the head of the take-up member 74. Pivot screw 66 is urged rotationally inwardly against bracket 64 by the torsional take-up spring 68. Take-up member 74 passes through the central opening formed through spring plate 72. Take-up member 74 is secured against rotation within spring plate 72 by means of a pin or cotter key 92 which passes through a transverse opening formed in the spring plate 72 and an aligned opening formed in the upper portion of take-up member 74. It will be understood that the torque developed by the torsional take-up spring 68 is adjustable through appropriate rotation of the take-up screw 74, after the upper and lower ends of take-up spring 68 have been appropriately attached to pivot screw 66 and take-up member 74, prior to the securing of take-up screw member 74 relative to the spring plate 72 by means of the cotter key 92.

The spring plate 72 is secured to portion 80 of the housing by screws or bolts 76 which pass through the openings 94 formed in diagonally disposed portion 86 of bracket 64. The lower ends of screws 76 are threadedly mounted within suitable openings (not shown) formed in portion 80 of the housing. Each of said screws 76 passes through a load spring 70 which is disposed intermediate the upper surface of diagonally disposed portion 86 and the lower surface of spring plate 72. During ordinary operation of the drive mechanism, i.e., within the output torque rating, a normal force at all the traction points and at the control roller-ball contacts is provided by the load springs 70 which urge the bracket 64 downward and to the left, as viewed in FIGURE 1, along a 45° line. The upper end of each of the load springs 70 is restrained by the spring plate 72 which in turn is restrained by the screws or bolts 76 threaded into portion 80 of the housing. The resulting force to the left, as viewed in FIGURE 1, acts through a thrust bearing 96 which is mounted upon a cylindrical extension of the input member or outer ring gear 34 of the differential transmission and intermediate a retaining ring 98 and boss portions 100 formed adjacent opposed surfaces of arcuate portion 102 of the bracket 64. The resulting force to the left also acts through the shoulder sections 104 of the input member or outer ring gear 34, through annular member 42, rollers or balls 48 and annular member 50 thereby urging annular member 50 against the driven means or reversing rollers 28. The reversing rollers 28, not being constrained in the direction of this force, urge the balls 22 to the left against the 45° traction contact surface 106 of annular member 108, which comprises a portion of surface 106 of annular member 108, which comprises a portion of the driving means 24, thereby urging the balls 22 inwardly against the traction contacts with the surface 110 of roller member 112 which comprises a portion of the driven means 26. The load springs 70, which urge bracket 64 downwardly, also provide a vertical force to control rollers 38 to urge same against the balls 22. This force is applied through a thrust bearing 114 and the gimbals 116, see FIGURE 3. This force is required in order to make the balls 22 rotate about an axis in a plane which passes through the axles 118 of the control rollers 38. Since the center of each ball 22 is not otherwise constrained vertically, the vertical force from the upper control roller is transmitted through the ball to the lower control roller. Tie rod 120 is a relatively weak structure thereby resulting in a negligable attenuation of the force being transmitted therethrough.

The function of the pivot screw and torsional spring combination is two fold. The load springs 70 push the bracket 64 along a 45° axis as previously described to maintain normal force at all traction contacts. The action of the pivot screw 74 and the take-up spring 68 combine to back up with a firm stop the position of the bracket 64 along the 45° axis under the action of the load springs 70. This firm stop prevents the compression of the load springs 70 and separation of one or more ball friction contacts particularly as occurs or tends to occur under the influence of high hydrodynamic action caused by the lubricating oil being swept between the rolling surfaces. Such separation or tendency to separate is a problem of increasing importance as the oil temperature decreases. Thus, even at low oil temperatures a boundry lubrication tends tto be maintained for proper transmission of tractive effort without slippage. Additionally, this firm stop created by the pivot screw 74 serves as a firm fulcrum, in the direction of the 45° axis and regardless of system wear, about which additional system force created by the operation of the anti-friction face type cam, hereinafter described, can transfer needed additional force to the control roller-ball contacts during overload conditions. Since the bracket 64 is constrained from longitudinal movement at and by the spring pins 78, the pivot screw-bracket junction is such as to permit small movement of the bracket radially with respect to the pivot screw axis, a freedom required to prevent binding and interference at the spring pins 78.

Referring now to FIGURES 2–4 and 13, a speed control system will now be described. First of all, control rollers 38, located on opposite sides of each ball, force or cause each ball to rotate on an axis lying in a plane which is parallel to the control roller axles 118. The axles 118 are linked to an external control shaft 122 so that rotating the control shaft 122 varies the angular position $\phi$ of the control roller 38 and the axis of rotation of balls 22. This causes the surface velocities at the output ball contacts, and hence the pitch line velocities of the output gears, to vary conversely; one increasing while the other is decreasing. When $\phi = 0$ the gear velocities are equal and opposite therefore the output speed is zero. When $\phi$ is moved plus or minus away from zero, the output speed is varied forward or reverse according to the equation $S_o = 1.276 \tan \phi$. The simple linkage connecting the control shaft to the control roller axles 118 is an arc tangent device so that $S_o$ is equal to $K\theta$, and the output speed $S_o$ is linear with $\theta$, the control shaft angle. It can be shown that the forward and reverse output speed will equal the input speed at $\phi$ equal to plus or minus approximately 38.5°. It is preferred that the travel of the control rollers axles 118 be limited such that $\phi$ can not reach plus or minus 45° since at this position spin damage would occur at the ball contacts.

As shown in FIGURES 2 and 3, control rollers 38 bear at the top and bottom of each ball 22. This arrangement forces each ball 22 to rotate about an axis lying in a plane which passes through the axles 118 of its corresponding top and bottom control rollers 38. The control rollers 38 are maintained parallel by means of a tie rod 120 while both of said rollers are being rotated about their common gimbal axis. The control linkage between the axles 118 of the control rollers 38 and the external control shaft 122 comprises gimbal 116 journaled in bearing 114 and to which are fastened slotted levers 124. Engaging the slots 126 in these levers 124 are pins 128 which are fastened to the control plate 130. Control plate 130 is guided for axial movement by opposed surfaces formed in the upper surface of bracket 64. The control plate 130 is actuated by gear 134 which is mounted on the external control shaft 122. The gear 132 engages a rack 136 which is mounted on the control plate 130. It will be understood that the size of the gear 134 and the location of the rack 136 may be varied for various control sensitivities. The bore of the control shaft bearing 138 is eccentric with respect to its pilot in the casing so that the rotation of the bearing 138 adjusts the back lash of the gear 132 against the rack 136.

Figure 4:
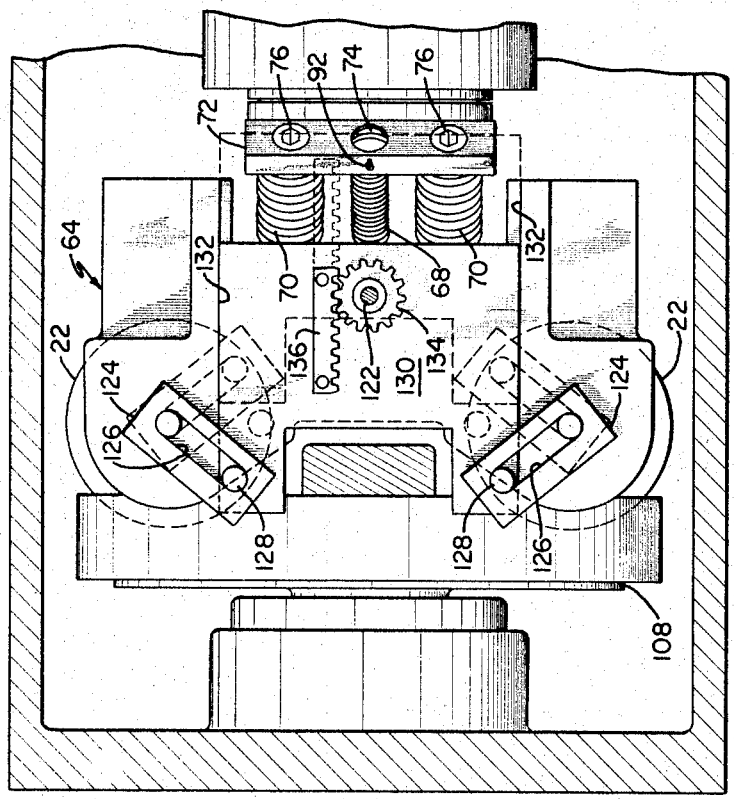
FIGURE 4 is a plan view, in partial cross-section, taken along line 4—4 of FIGURE 1.

Referring now to FIGURES 1 and 4, when the control shaft 122 is rotated through angle $\theta$ the control plate 130 moves linearly, its pins 128 move the slotted levers 124, hence the gimbals and the control rollers move through angle $\phi$. The combination of the slotted levers 124 and pins 128 described above provide the arc tangent function previously described. The combination of this arc tangent characteristic of the control linkage with the tangent relationship of $\phi$ to the output speed causes the output speed to be inherently proportional to the external control shaft angle $\theta$, continuous through and symmetrical about its zero position corresponding to zero output speed.

The system for preventing excessive overloads from being transmitted between the differential system 30 and the driven means 26 and 28 is best understood by referring to FIGURES 1, 7, 8 and 13. The six fluted cam surfaces formed on opposed surfaces of the anti-friction face-type cam 40 are substantially identical, both having ramps or path portions rising upwardly from their deepest parts and between which rollers or balls 48 are positioned in predetermined relationship with respect to each other. As previously explained, the load springs 70 provide system force through the combination of the opposed cam surfaces and the rollers or balls 28. Thus, the action of the load springs 70 is to urge the opposed cam surfaces to rotate relative to each other until the rollers or balls 48 rest in the bottoms of both cam surfaces. When torque is delivered or absorbed by the output member 36 a proportional amount of torque is transmitted to annular member 42 attached by pins 44 to ring gear 34 which is coupled through the planet gear through the output member 36. This torque urges the opposed cam surfaces to rotate with respect to each other and they would do so except for the keying action provided by the rollers or balls 48 located in the bottoms of cam surfaces as aforementioned. When the output member torque exceeds a value predetermined by the force of the load spring 70 and the resistance offered by the slope or inclination of the cam surfaces, one cam surface begins to rotate relative to the other one and thereby adds additional force to the system over and above that produced by the load springs 70. Thus, during overload torque situations the system force is increased automatically as needed to prevent slip. The slope or angle of inclination of the cam surfaces is less than the critical value, as previously described, below which there is more than sufficient system force produced to prevent slip at any output torque. The degree of actual rotation of cam surfaces with respect to each other is determined not only by the amount of output torque but also upon the effective flexure of the complete force system structure. If the output torque is increased progressively, the rise of the cams would increase to a value of strain in the system structure that would cause breakage before the balls or rollers of the anti-friction face-type cam rode over the high points of the cam surfaces to reduce again the system strain and force. This is especially true in view of the firm fulcrum provided by the pivot screw 66 previously described. To prevent this from happening, the upper portion 62 of the cam slopes have a smaller angle of inclination than the lower portion 60 of the cam surfaces. This means that by proper configuration of the upper portions of the cam surfaces the maximum amount of overload torque and system forces that can be developed are controlled at will. As previously explained, the upper portions of the cam surfaces intersect to form an apex. The upper portions of the cam surfaces should not intersect to form a flat spot or surface. The existence of such an apex prevents the rollers or balls from coming to a rest between the cam surfaces, a condition which is to be avoided.

When this maximum value of overload torque is exceeded or the drive mechanism is completely stalled, the cam over-rides as previously explained. When the rollers or balls pass over the high points or apices of the cam surfaces, the high cam force present then urges the cam surfaces into reverse rotational direction which in turn reverses the torque being delivered to or absorbed from the output member. The net effect is pulsation, forward and reverse, of the output member if the overload torque persists. This has a tendency at low cam override speeds to break loose certain types of jammed mechanisms and thereby relieve the overload. With each cam override, at low override speeds, the cam measures the output torque. If the overload has been removed, the cams return to their normal position with the balls or rollers resting at the bottoms of the cam surfaces. Throughout the complete schedule of events, sufficient system force is automatically maintained to prevent traction slippage. Also, an excessive overload torque which makes the cams override causes an audible warning sound.

Should the drive mechanism be stalled when the speed control shaft is set for a high value of output speed, the action explained above would tend to produce a rapid pounding effect which could be destructive to the system structure. However, this does not happen because as the speed of the cam override increases the phase relationship of the cam surfaces to each other and to the balls changes such that the resulting variable separation of the cam surfaces greatly diminishes and the cam surfaces act more or less as normal thrust bearing races.

The control rollers have concave profiles with a radius curvature more than the radius of curvature of the balls 22 which they contact. The purpose of this configuration is two fold. First, the length of the area of contact between the control rollers 38 and the balls 22 in a direction parallel to the axis of the control rollers is relatively large. The effect of this is a tendency of the hydrodynamic action of the oil being swept between the control rollers and the balls to tend toward separating same slightly and thereby reduce the magnitude of control torque required to rotate the control rollers about their gimballed axis. This tendency to separate, to the extent that it happens, does not, however, present a serious problem from an overall control viewpoint. Secondly, the control rollers have more or less close conformity to the ball in a direction parallel to their axes. This close conformity creates a stabilizing action in this direction against the reaction of the drive output torque which tends to rotate the ball and hence the control roller surface along said axis. Each gimbal 116 bearing on a corresponding control roller axle 118 is supported by a single radial or thrust bearing 114 which allows the control roller contacting surfaces to move along said axes as urged by the above output torque reaction. In so doing, the axis of contact and force application on the ball moves out of the vertical axis in the opposite direction in amount sufficient only to create a component of force which is equal to and opposite to that created by the output torque reaction causing its movement. Thus, there is no moment present to rotate the axis of the thrust bearing 114 and the use of a single thrust bearing at this location becomes feasible and is desirable for self-centering action.

Figure 9:
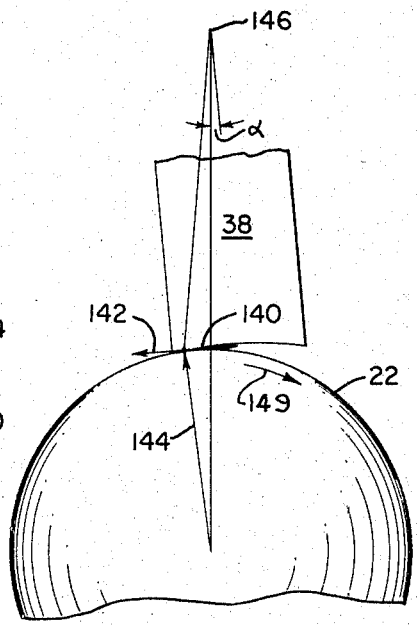
FIGURE 9 is an enlarged schematic depiction showing the position of one of the rollers relative to its ball during operation of the drive mechanism.

The self centering action is understood by viewing FIGURE 9, wherein the points of external application of force between ball and control roller are 146 and nominally the ball center. However, in the presence of output torque created reaction on the ball, or due to slight angular misalignment top to bottom of the control rollers, the ball surface will attempt to move in the direction shown by arrow 149. The effect of this is to tilt by friction action the gimbal control roller assembly through a small angle α and at the same time exert an upsetting force 140 on the control roller. The effect of said tilt is to move the point of ball-roller contact in the direction opposite to force 140 with the effect that force 142 is created in the roller in opposition to force 140 tending to cancel it out so that there is no net transverse component of force acting on the said assembly to create further upset. Force 142 is the direct result of force 144 moving out of the line joining the points of application 146 and the ball center, thereby creating transverse component 142.

In order to keep the control shaft torque to a minimum, it is desirable that the radial or thrust bearing 114 comprises an anti-friction ball bearing. However, this thrust bearing 114 may be operated for long periods without rotation such as occurs when a constant output speed is maintained during which time internally generated vibration may be present. The generation of such vibration produces false brinelling ball pockets in the races of the thrust bearing 114 as is to be expected for any ball bearing subjected to similar conditions. Bearing damage results when the axis of rotation of the gimbal and the inner race of the bearing 114 rotate back and forth or orbitally out of coincidence with the axis of the outer race of the bearing 114. To eliminate the working or fretting of the balls against the races, it has been found desirable to have the vibrational movement take place at the junction of the gimbal and the inner race since at this point such vibrational movement is harmless as contrasted where same takes place at the highly finished ball races. This is effected by the gimbal configuration shown in FIGURE 3 wherein the gimbal contact with the inner bearing race provides vertical thrust and piloting action but allows a relative degree of freedom of rotational movement of the gimbal and inner race axes.

Figures 10, 12:
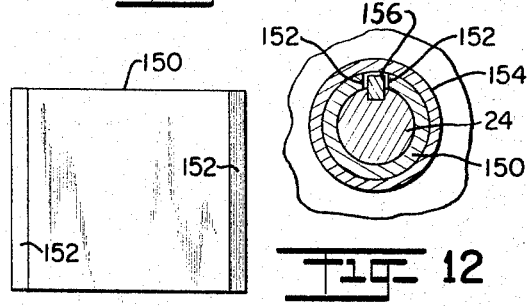
FIGURE 10 is a plan view of a flexible member used to form a key slot.
FIGURE 12 shows the flexible member of FIGURES 10 and 11 mounted to the inner surface of a sleeve member to form a key slot.
Figure 11:
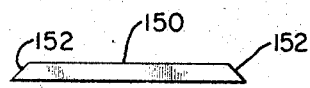
FIGURE 11 is a front elevational view of the flexible member shown in FIGURE 10.

Referring now to FIGURES 10–12, the manner in which a keyway or key slot is uniquely formed is now described. In FIGURE 10 is shown a piece of flexible or cushioning or energy absorbing material such as a fabric that is impregnated with polytetrafluoroethylene or an oil-resistant rubber-type material. The member or coupling pad 150 is simply a flat piece of said material with two beveled edges 152. The member 150 is curled or rolled into a cylindrical shape with the beveled edges 152 disposed parallel to each other. The member in this configuration has been adhesively mounted in the cylindrical bore of a hollow sleeve member 154 which is an integral part of annular member 108, see FIGURE 1. The parallel beveled edges 152 form a keyway into which a key 156 is inserted, said key 156 also engaging the external driving member.

The use of a keyway or key slot formed in the manner as above-described is advantageous for a number of reasons. Such a keyway constitutes a simple, compact and low cost coupling which is easily and quickly inserted into a simple bore. This precludes the necessity of additionally machining or forming a keyway within the wall surface of the bore. The beveled ends 152 of the coupling pads are in compression circumferentially and thus the bond between the coupling pad and the surface to which same is mounted is subjected to shear stress adjacent said beveled ends. Under some circumstances such bond might be broken; however, at points farther removed from the ends of the member the circumferential compression pushes or wedges the pad radially outwardly thereby aiding the adhesive bond. It is to be understood that a power transmitting keyway may be formed without the necessity of bonding the cushion material within the bore. By suitable choice of material which does not fret or produce fretting corrosion, the problem of ablative material deterioration is eliminated. In case the material from which the member 150 is formed is semipilable as aforesaid, it has a tendency to take a permanent compressive set with prolonged use but this effect is arrested if clearances are kept reasonably small since the material is soon in volume compression except for the axial ends of the pad far removed from the stress area in the middle of its length. If the material chosen is also somewhat resilient, there results a cushioning effect in the torsional torque transmission mode which is beneficial in many applications including this one since some motors do not produce a uniform torque with the result that the vibrational torque in the absence of the cushioning effect produces objectionable noise.

With a single key type of coupling as is used in many motor applications, the reaction of the torque transmission through the key produces a force on the shaft which makes the shaft lean over bodily by bending action with the result that this also tends to produce vibration when the shaft bears vibrationally on the cylindrical bore of the normal keyway socket. However, with a coupling in accordance with this invention there is cushioning all around the shaft so that noise does not result.

Where two or more drive mechanisms of the subject invention are connected in tandem and/or two or more control shafts are geared together to a common control shaft, the final output drive is proportional to the square, cube or higher power of the common control shaft angle. In essence, the valve of multiple drives connected integrally together and with various interconnections of control shaft permit computation at appreciable horse power levels with a very simple mechanical package not complicated with complex electrical gear.

Figure 14:
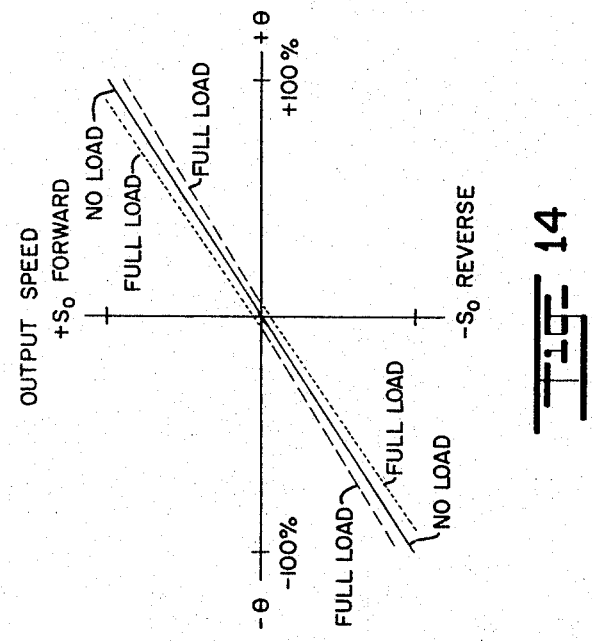
FIGURE 14 is a graphic diagram showing the relationship of the output speed to the control shaft angle.

In FIGURE 14 is shown a graphic relationship between the output speed and control shaft angle $\theta$. FIGURE 14 demonstrates that the output speed, both with and without torque load, is linear with the control shaft angle and continues through zero speed and is symmetrical about it.

Figure 15:
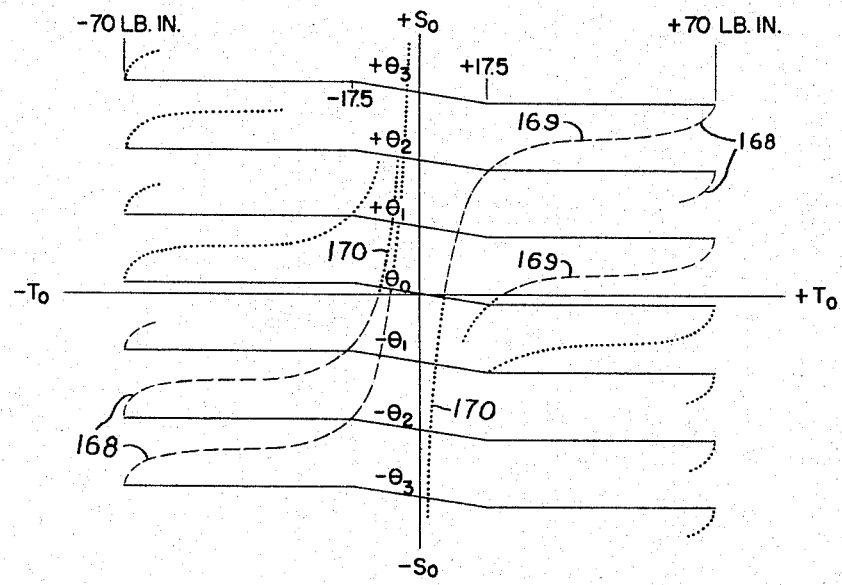
FIGURE 15 is a graphic diagram showing the relationship between the output speed and the output torque.

FIGURE 15 shows the relationship of output speed plotted against output torque for various control shaft angles $\theta$. As previously explained, the tractive contact forces being held constant during normal output torque loads, e.g. from zero to plus or minus 17.5 lb.-in., causes the slope of the speed torque curve to be negative, finite and an essentially constant value. For overload conditions up to the point where the cams override, e.g., at 70 lb.-in. as shown, the output speed remains unchanged with increased torque. This is caused by the cam's production of system force being proportional to output torque and movement of the balls or rollers over the lower portions 60 of the cam surfaces. When the rollers or balls 48 reach the upper portion 62 of the cam surfaces, each ball or roller is swept over portions 62 and pass over a corresponding apex 56 of the cam surfaces. When the cams override, the drive mechanism stalls or runs away depending on the nature of the load. Under these conditions, the drive mechanism ceases to generate additional output torque and internal system force thereby preventing self destruction. If the excessive overload output torque load has not been removed, the cam surfaces continue to rotate relative to each other and create an audible warning signal. If the relative speed of the cam surfaces remains low, as with some types of loads, the balls and cam surfaces tend to remain in their initial phase relationship with each other as the cam surfaces rotate. This causes the drive mechanism to urge its output shaft in a rotational oscillatory manner as previously explained since the cam creates a negative torsional effect when the apices of one of the cam surfaces pass the corresponding apices of the other cam surface at a time when the balls are between the two apices. The peak oscillatory value of output torque then remains substantially equal to the initial maximum overload torque at which cam override occurs. This is represented by portion 160 of the curve shown in FIGURE 16 and by portion 168 of the curve shown in FIGURE 15. However, as the velocity of override of the cam surfaces increases, such increase being due to the presence of an active motor type of overload or due to the combination of a relatively high speed setting in the presence of a passive or friction type of load, the phase relationship of the balls with respect to the cam becomes such that when the balls are in contact with the bottoms of one of the cam surfaces they are also in contact with the apices of the other cam surface. As a result, this tends to create a more or less fixed displacement between the two cam surfaces regardless of their relative rotational position. One of the effects produced by this shift is to reduce greatly the ability of the drive to create pulsating torque at the output shaft and a pulsating system force, both of which could create deleterious pounding effects at high speed cam override. A further effect produced by this shift is that the average value of torque at the output shift is greatly diminished which means the drive in effect decouples itself at high cam override speeds from the external excessive overload. It should be noted that regardless of the speed of the cam override there is no slip device employed such as in U.S. Patent No. 3,071,018 to absorb the difference in speed setting and actual output speed, all members of the speed system being in rotating contact and prevented from slipping by the cam itself as explained earlier. Thus, the heat produced by excessive overload is not substantial. The great reduction in this average value in output torque with increased difference between set speed as determined by control shaft angle θ and the actual value of a speed is shown by portion 169 of the curve shown in FIGURE 15. Portions 170 of the curves shown in FIGURE 15 represent the situation wherein the difference in set speed and the actual speed becomes very large. Under these conditions the phase shift as described above approaches completion and the resulting average output torque approaches zero. This same output torque characteristic is also portrayed by portion 162 of the curve shown in FIGURE 16.

Figure 16:
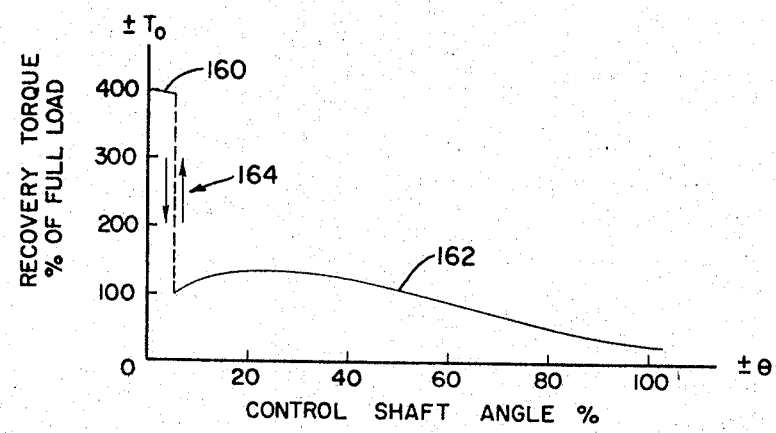
FIGURE 16 is a graphic diagram showing the recovery output torque available after stall occurs.

FIGURE 16 is a graphic diagram showing the recovery output torque available after stall occurs. This is on the basis of a passive load such as friction. Portion 160 of the curve represents the peak value of oscillatory torque. Portion 162 of the curve represents the average value of output torque. Portion 164 of the curve shown in FIGURE 16 and portion 169 of the curve shown in FIGURE 15 represent the approximate place where substantial phase shift takes place.

Figure 17:
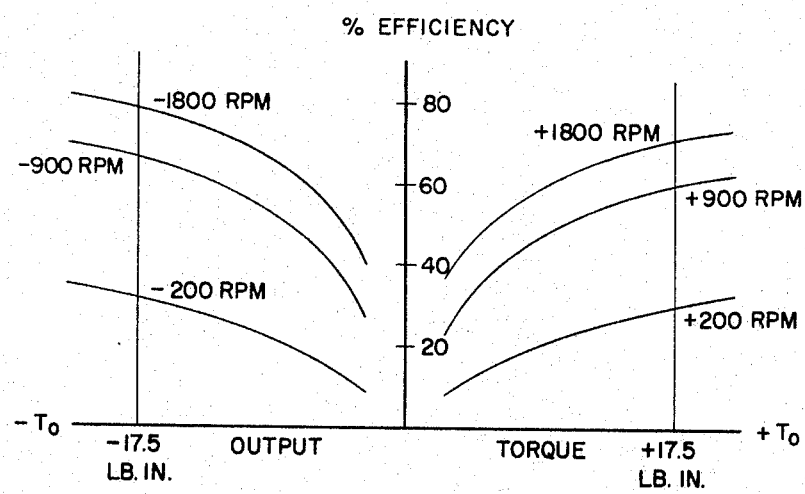
FIGURE 17 is a graphic diagram showing the relationship of the power efficiency to the output torque.

FIGURE 17 is a graphic diagram showing the relationship of the power efficiency to the output torque for various speed settings in both the forward and reverse directions of the output shaft.

Referring now to FIGURE 13, it will be appreciated that each ball 22 drives a pair of driven members 26 and 28. This is in contrast with the drive of U.S. Patent No. 3,071,018 in which each ball drives only a single member. Although the speed relationship between the position of the control rollers 38 and the driven members 26 and 28 have not been heretofore described in any detail, it is believed that the relationship existing between the position of control rollers 38 and the speed of the driven members 26 and 28 will be more or less evident by reviewing the description contained in U.S. Patent No. 3,071,018 wherein each ball drove a single member.

From the foregoing, it will be readily apparent that a unique and novel drive mechanism has been described. The drive mechanism of this invention is characterized in that it incorporates use of a pair of center fixed balls each of which drive a pair of driven means. Further, this mechanism uses a differential system having a pair of inputs and an output and in which the output of the output member is the algebraic sum of the inputs of the two input members. The drive mechanism of the subject invention also utilizes an improved torque sensing thruster means, improved means for controlling the axes of rotation of the balls, improved means for controlling the axes of rotation of the balls, improved means for applying and maintaining normal traction contact force during normal output torque and, during overload torque conditions, a variable contact force proportional to the amount of overload torque to maintain nonslipping frictional contact between various parts used in the drive mechanism, and a uniquely formed keyway. These and other advantages as are outlined above are available from the use of a drive mechanism constructed in accordance with the subject invention.

It is to be understood that this invention is not limited to the exact embodiment of the device shown and described, which are merely by way of illustration and not apparent to those skilled in the art, and it is therefore intended that the appended claims cover all such changes and modifications.

I claim:

1. A drive mechanism comprising a pair of spaced-apart spherical balls having fixed centers; a driving means disposed in frictional contact with each of said balls for driving same; a pair of driven means; a rotational differential system having two input members and an output member, the output of said output member being the algebraic sum of the inputs of said input members; each of said balls frictionally contacting and driving each of said driven means, one of said driven means being coupled with one of said input members of said differential system and the other said driven means being coupled with the other said input member of said differential system; means for controlling the axes of rotation of said balls.

2. A drive mechanism as described in claim 1 in which said means for controlling the axes of rotation of said balls includes control rollers for controlling the axis of rotation of each ball.

3. A drive mechanism as described in claim 2 in which said control rollers include means for preventing the axes of rotation of said balls from being coincident with any surface portion of said balls disposed in frictional contact with said driving and driven means.

4. A drive mechanism as described in claim 2 in which said differential system includes a planetary gear set having a sun gear, planet gears and an outer ring gear and in which one of the input members of said planetary gear set includes the sun gear and the other input member of said planetary gear includes the outer ring gear and the output member includes the planet gears.

5. A drive mechanism as described in claim 2 in which said driven means includes a pair of reversing rollers, each reversing roller frictionally contacting a respective one of said balls, both of said reversing rollers being coupled to one of said input members of said differential system.

6. A drive mechanism as described in claim 2 in which said driven means includes a rotatably mounted member having an external annular surface which is disposed in frictional contact with each of said balls, said member being coupled with one of the inputs of said differential system, and a pair of direction-reversing idler rollers, each of which is disposed in frictional contact with a respective one of said balls, said idler rollers being coupled with the other input of said differential system.

7. A drive mechanism as described in claim 4 in which said driven means includes a rotatably mounted member having an external annular surface which is disposed in frictional contact with each of said balls, said member being coupled with the sun gear, and a pair of direction-reversing idler rollers, each of which is disposed in frictional contact with a respective one of said balls, said idler rollers being coupled with the outer ring gear.

8. A drive mechanism as described in claim 2 including a system for preventing excessive overloads from being transmitted between said differential system and said driven means.

9. A drive mechanism as described in claim 8 in which said system for preventing excessive overloads from being transmitted between said differential system and said driven means includes an anti-friction face-type cam.

10. A drive mechanism as described in claim 9 in which said anti-friction face-type cam includes a plurality of rising and falling annularly disposed surface portions the lower part of each surface portion being relatively steep compared with the upper part thereof.

11. A drive mechanism as described in claim 10 in which the upper parts of adjacent surface portions intersect form an apex.

12. A drive mechanism as described in claim 8 in which said system for preventing excessive overloads from being transmitted between the differential system and said driven means includes a pair of fluted cam surfaces formed on opposed surfaces of a pair of members, one of said members being coupled with one of said driven means and the other of said members being coupled with one of the input means of said differential system, and a plurality of rollers mounted within said cam surfaces.

13. A driving mechanism as described in claim 8 in which said system for preventing excessive overloads from being transmitted between said differential system and said driven means includes a pair of opposed, annularly disposed recess portions, each recess portion comprising a plurality of path portions, each recess portion including a plurality of apex portions formed by the intersection of adjacent path portions and a plurality of bottom portions formed by the intersection of adjacent path portions, the lower part of each path portion having a larger angle of inclination than the upper part thereof, one of said annularly disposed recess portions being formed on the surface of a member that is coupled to one of said driven means and the other of said annularly disposed recess portions being formed on the surface of a member that is coupled to one of said input means of said differential system, and a plurality of rollers mounted between said opposed recess portions.

14. A drive mechanism as described in claim 4 including a system for preventing excessive overloads from being transmitted between said planetary gear and said driven means, said system including a pair of fluted cam surfaces formed on opposed surfaces of a pair of members, one of said members being coupled with one of said driven means and the other of said members being coupled with the outer ring gear of said planetary gear, and a plurality of rollers mounted within said cam surfaces.

15. A drive mechanism as described in claim 7 including a system for preventing excessive overloads from being transmitted between said planetary gear and said reversing idler rollers, said system including a pair of opposed, annularly disposed recess portions, each recess portion comprising a plurality of path portions, each recess portion including a plurality of apex portions formed by the intersection of adjacent path portions and a plurality of bottom portions formed by the intersection of adjacent path portions, the lower part of each path portion having a larger angle of inclination than the upper part thereof, one of said annularly disposed recess portions being formed on the surface of a member that is coupled to said reversing idler rollers and the other of said annularly disposed recess portions being formed on the surface of a member that is coupled to the outer ring gear, and a plurality of rollers mounted between said opposed recess portions.

16. A drive mechanism as described in claim 2 including means for applying a predetermined amount of force at all traction contacts within the mechanism.

17. A drive mechanism as described in claim 2 including means for applying a predetermined amount of force between said balls and the driving and driven means and the control rollers contacting said balls.

18. A drive mechanism as described in claim 2 including a torque sensing thrustor means disposed intermediate said differential system and said driven means.

19. A drive mechanism as described in claim 18 including means for applying a predetermined amount of force between the balls and the driving and driven means and control rollers frictionally contacting said balls and between the parts comprising the torque sensing thrustor means.

20. A drive mechanism as described in claim 2 including means for applying a predetermined amount of force and, during overload torque conditions, a variable amount of force proportional to the amount of overload torque to maintain substantially non-slipping frictional contact between the balls and the driving and driven means and the control rollers frictionally contacting said balls.

21. A driven mechanism as described in claim 4 including means for applying a predetermined amount of force and, during overload torque conditions, a variable amount of force proportional to the amount of overload torque to maintain non-slipping frictional contact between the balls and the driving and driven means and the control rollers frictionally contacting said balls.

22. A drive mechanism as described in claim 18 including means for applying a predetermined amount of force and, during overload torque conditions, a variable amount of force proportional to the amount of overload torque to maintain non-slipping frictional contact between the balls and the driving and driven means and the control rollers frictionally contacting said balls and between parts comprising the torque sensing thrustor means.

23. A drive mechanism as described in claim 2 in which said means for controlling the axes of rotation of said balls includes a pair of rollers for each of said balls, each of said rollers being gimbally mounted and disposed in contacting engagement on opposite sides of said ball, the gimbal of each of said rollers being disposed in contacting relation with respect to a thrust bearing, said gimbal and said thrust bearing being mounted relative to each other to permit pivotal motion of said gimbal with respect to the axis of the inner race of said bearing.

24. A drive mechanism as described in claim 2 in which said means for controlling the axes of rotation of said balls includes a pair of rollers for each of said balls, each of said rollers having an annular surface, said surface having a generally concavely profile, said rollers being disposed on opposite sides of said ball, each of said rollers being gimbally mounted, and means for maintaining each of said rollers for each ball parallel one with the other.

25. A drive mechanism as described in claim 7 in which said means for controlling the axes of rotation of said balls includes a pair of rollers for each of said balls, each of said rollers being gimbally mounted and disposed in contacting engagement on opposite sides of said ball, the gimbal of each of said rollers being disposed in contacting relation with respect to a thrust bearing, said gimbal and said thrust bearing being mounted relative to each other to permit pivotal motion of said gimbal with respect to the axis of the inner race of said bearing.

26. A drive mechanism as described in claim 2 in which said means for controlling the axes of rotation of said balls includes a pair of control rollers for each ball, the axles of both control rollers of each pair being directly intercoupled by an elongated member.

References Cited
UNITED STATES PATENTS

| 1,985,110 | 12/1934 | Sharpe | 74—690 X |
| 2,164,504 | 7/1939 | Dodge | 74—690 |
| 2,177,946 | 10/1939 | Pollard | 74—690 |
| 3,071,018 | 1/1963 | Floyd | 74—198 |

ROBERT A. O'LEARY, *Primary Examiner.*

THOMAS C. PERRY, *Examiner.*